Dec. 18, 1923.

C. J. PETERSON

WINDING APPARATUS

Filed Nov. 9, 1921

Witness
W. K. Olson

Inventor:
Christen J. Peterson
By Glenn S. Noble
Atty.

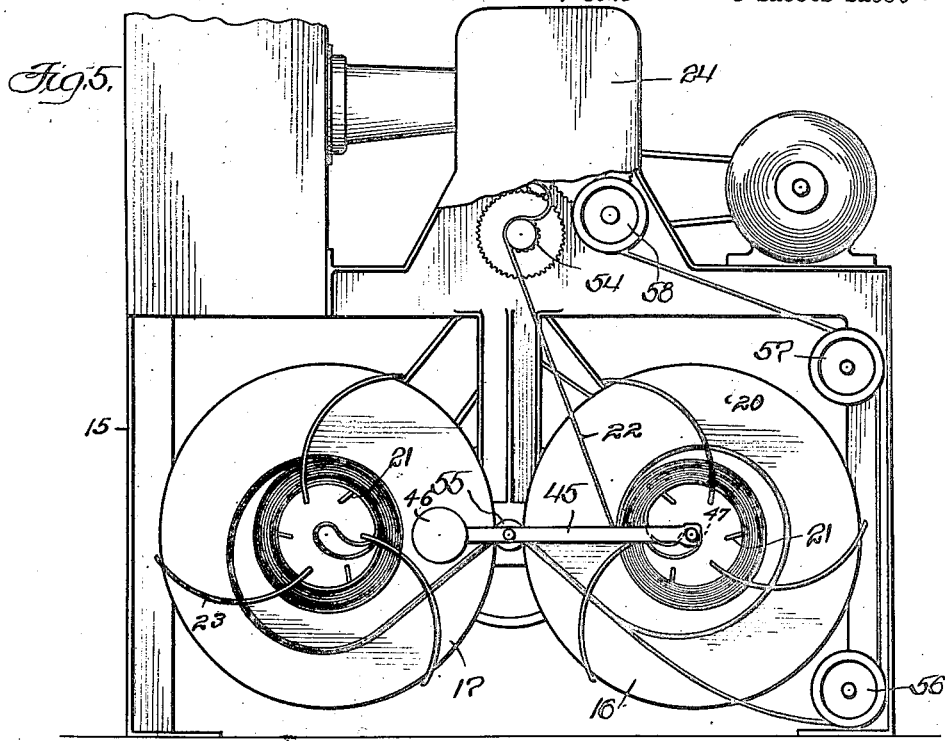
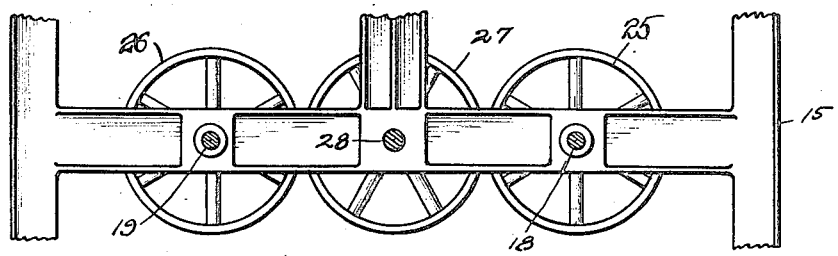
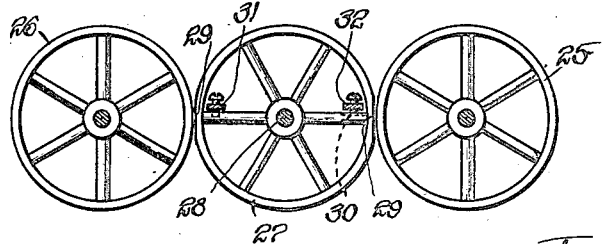

Dec. 18, 1923.  
C. J. PETERSON  
WINDING APPARATUS  
Filed Nov. 9, 1921  
1,477,765  
3 Sheets-Sheet 3

Witness:  
W. K. Olson

Inventor:  
Christen J. Peterson,  
By Glenn S. Noble  
Atty.

Patented Dec. 18, 1923.

1,477,765

UNITED STATES PATENT OFFICE.

CHRISTEN J. PETERSON, OF CHICAGO, ILLINOIS.

WINDING APPARATUS.

Application filed November 9, 1921. Serial No. 513,990.

*To all whom it may concern:*

Be it known that I, CHRISTEN J. PETERSON, a citizen of the United States, residing at Chicago, in the county of Cook and State of Illinois, have invented certain new and useful Improvements in Winding Apparatus, of which the following is a specification.

This invention relates more particularly to means for winding up and paying out a continuous band or film such as the film of a continuously operating moving picture machine. In moving picture machines of this character, it is desirable to provide means for taking care of a continuous band of considerable length and manipulating the film so as to cause the least possible injury to the same. In accordance with the present invention I provide means whereby the film may be wound up on one reel and unwound from another reel and the action then reversed so that the film will be again wound up on the reel from which it was unwound and will be unwound from the other reel.

The objects of this invention are to provide a simple and efficient winding apparatus for accommodating and taking care of a relatively long continuous band or film while a portion of the film is moving continuously in one direction; to provide two winding reels for winding up a continuous film and means for causing the film to assume winding and unwinding relations with the respective reels and means for reversing the movement of the reels; and in general to provide such an improved automatic winding apparatus as will be described more fully hereinafter.

In the accompanying drawings illustrating this invention—

Figure 5 is a rear view;

Figure 6 is a detail showing the arrangement of the bearings for the shafts;

Figure 7 is a detail of the frictional reversing wheels; and

Figure 1:
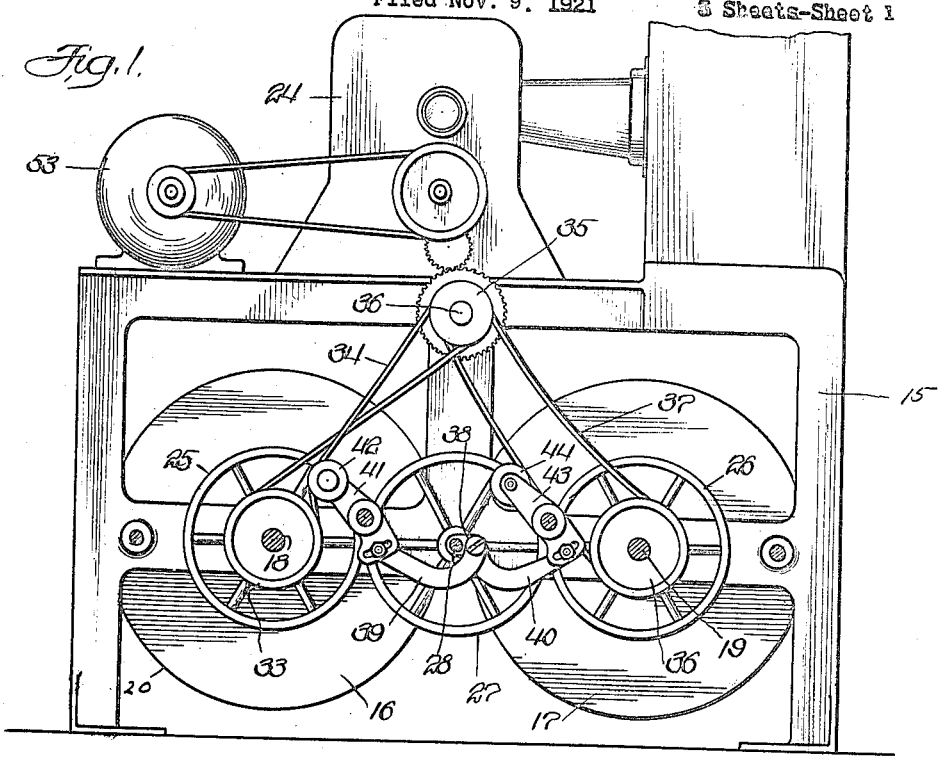
Figure 1 is a front sectional elevation taken on the line 1—1 of Figure 2.
Figure 2:
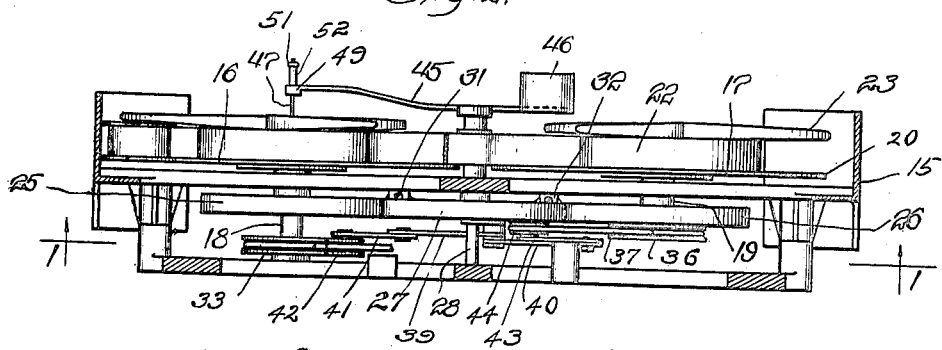
Figure 2 is a sectional view taken on line 2—2 of Figure 1.
Figure 3:
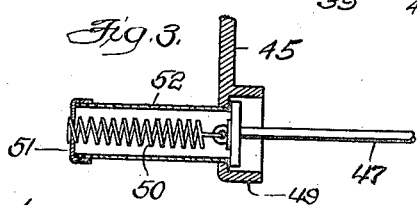
Figures 3 and 4 are details of the film changing fingers.
Figure 4:
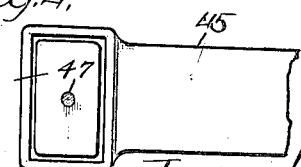

It will be understood that the present winding apparatus is adapted for use with any ordinary or preferred form of projecting machine but it is desirable that the same be driven from the same motor or source of power used for the machine. In the particular form of the apparatus as shown in these drawings, 15 represents a main frame or casing which may be made of any suitable material and design to support the different working elements. Two reels, 16 and 17, are carried on shafts 18 and 19, which are mounted in suitable bearings in the frame 15. Each of these reels is formed of a plate 20 and has a hub formed of pins or projections 21 arranged around the central portion thereof for receiving the film 22. Some of the projections 21 are provided with curved guides 23, which form the outer portions of the reels.

The film 22 comprises an endless band which is adapted to pass through the projecting machine indicated at 24. This machine may be of any usual construction and is provided with the usual feed sprockets for passing the film through the machine. One of the principal features of this invention is the means provided for causing the film to be wound up on one reel while being unwound from the other reel and then reversing the action so that the film will be unwound from the first reel while being wound up on the second reel. In the present instance this reversing action is initiated or controlled by utilizing the tension on the film as it is drawn into the machine, for reversing the movement of one of the reels and thereby causing the reversal of the movement of the other reel and also the shifting of the film from winding relation with one reel to winding relation with the other reel.

The shafts 18 and 19 are provided respectively with suitable wheels 25 and 26 each of which is adapted to coact with a central wheel 27 which is mounted on a shaft 28, this shaft also being carried by suitable bearings in the frame 15. The wheel 27 has two flat spots 29 on the opposite sides thereof in order to allow the coacting wheels to rotate freely when the wheel 27 is in normal position. The several wheels are made with any suitable peripheries so that the outer wheels will engage at times with the center wheel to cause a partial rotation thereof. In the present instance these wheels are made so that they engage with frictional engagement. The wheel 27 has a projection 30 which is adapted to engage with adjustable stops 31 and 32 so that this wheel will only rotate approximately one hundred and eighty degrees.

The shaft 18 has a pulley 33 fixed thereon which is driven by a cross belt 34 from a pulley 35 on a shaft 36 which shaft is driven by suitable gearing from the projecting machine 24. The shaft 19 has a pulley 36 secured thereto which is driven by a straight belt 37 from the pulley 35, the arrangement being such that the belts will serve to drive the shaft and reels in opposite directions.

The shaft 28 carries a crank arm 38 having two links 39 and 40 pivotally connected therewith. The opposite end of the link 39 is adjustably connected with a lever 41 having a pulley 42 at its outer end for engagement with the belt 34 and serving as a tightener for the belt. The link 40 is adjustably connected to a lever 43 which has a pulley 44 at its outer end which serves as a tightener for the belt 37. When the parts are in the position shown in Figure 1, the belt 34 is in driving engagement with the pulley 33 and the reel 16 is being driven in clockwise direction while the belt 37 rides loosely on the pulley 36 and the reel 17 is moving also in clockwise direction to permit the film to be unwound from the same.

The shaft 28 also carries an arm 45 which has a weight 46 at one end thereof and a flexible or yielding finger 47 at the opposite end thereof. This finger may be made in any suitable manner for shifting the film from one reel to the other, for instance, the finger proper may be secured to a plate 48 which fits in a socket 49 at the end of the arm 45 and a tension spring 50 is attached to the inner end of the finger and to a fastening 51 at the end of a tube 52 which is also secured to the arm 45, the arrangement being such that the spring tends to hold the finger in a position normal to the arm but allows the finger to swing sidewise when necessary.

The projecting machine is driven from any suitable source of power, as by means of a motor 53 and the usual driving mechanism, the motor also serving to actuate the film winding apparatus.

Figure 8:
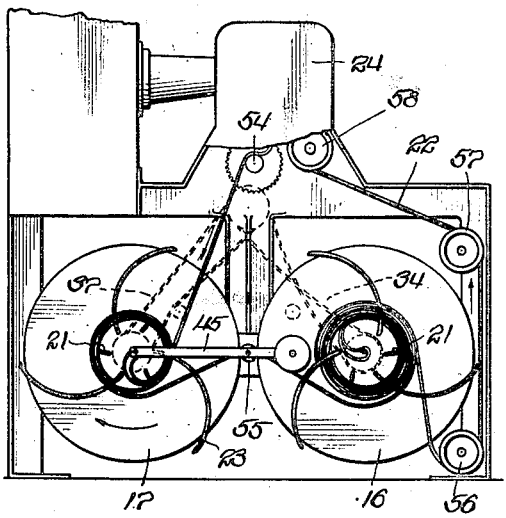
Figures 8, 9, 10 and 11 are diagrammatic views illustrating the method of operation of the device.
Figure 9:
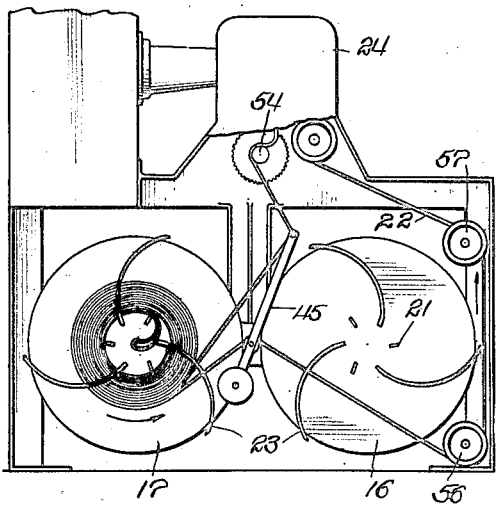
Figure 10:
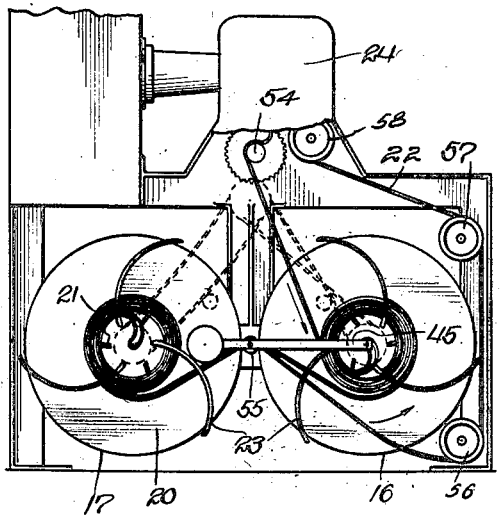
Figure 11:
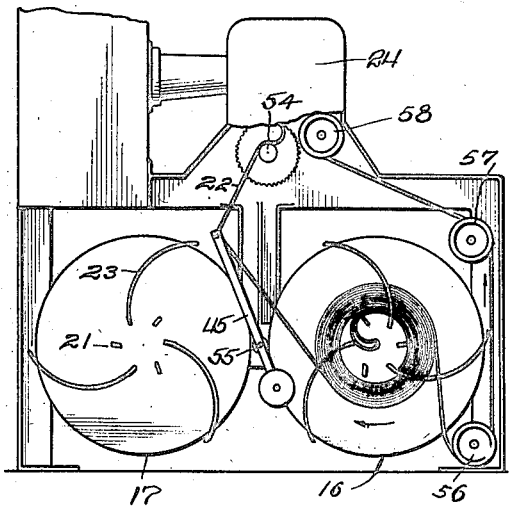

The operation of the apparatus is illustrated in several of its phases in Figures 8 to 11. As shown in Figure 8, the reel 17 is being driven to wind the film 22 thereon, it being understood that the film is wound double or in two plies on the reel. One reach of the film passes directly from the discharge sprocket 54 of the projecting machine 24 to the reel 17. The other reach of the film is drawn from the reel 16 over a guide roller 55 to the reel 17. The other reach of the film from the reel 16 passes down under a guide roller 56 and then up over a guide roller 57 and to the feed sprocket 58 of the projecting machine. From this it will be seen that as the film is being unwound from the reel 16, one portion goes to the projecting machine while another portion goes to the reel 17 which also takes up the film as it is discharged from the projecting machine. When the film has all been unwound from the reel 16, it will be seen that one reach passes directly from the reel 17 around the guide wheels 55, 56, and 57 to the projecting machine which continues to draw in on this reach of the film. As soon as the tension on this portion of the film is sufficient to overcome the frictional drive on the reel 17, the reel 17 will be rotated in a reverse or anti-clockwise direction as indicated in Figure 9. This reverse movement causes the friction wheel 26 to actuate the wheel 27 and to cause its revolution through one hundred and eighty degrees. It will be noted that on account of the flat spot on the wheel 27, the wheel 26 had previously merely kept sufficient contact with the wheel 27 so as to hold the projection 30 against the stop 31 and with the arm 45 in the position shown in Figure 8, but as soon as the movement of the wheel 26 was reversed, the arm 45 and weight 46 caused a partial rotation of the shaft 28 and brought the wheel 27 into rotative engagement with the wheel 26. As the wheel 27 turns its shaft 28, it actuates the links or toggles and throws the pulleys 42 and 44 into and out of engagement with their respective belts. This causes the belt 37 to run free and places a tension on the belt 34, thereby causing the shaft 18 and reel 16 to be driven from the motor. The movement of the shaft 28 causes the arm 45 to swing over as shown in Figure 9 so that the pin 47 is first swung out of its loop in the reel 17, then engages with the portion of the film between the sprocket 54 and reel 17 to form a new loop which is passed down and in between the projections 21 or hub of the reel 16. The pin remains in this position and the reel 16 immediately begins to wind up the film in the manner shown in Figure 10. As soon as all of the film has been unwound from the reel 17 and the tension due to the pull of the projecting machine on the film reverses the movement of the reel 16, the shaft 28 is again actuated and the arm 45 swung over to form a new loop in the center of the reel 17 and this reel will again wind up the film as shown in Figure 8.

From this description it will be seen that I provide an exceedingly simple and efficient means for taking care of the endless film used in continuous projecting machines and provide an apparatus which is not liable to get out of order. However, it will be noted that various changes may be made in the details of construction and arrangement of parts without departing from the scope of this invention and therefore I do not wish to be limited to the exact construction or arrangement shown and described except as specified in the following claims:

1. In an apparatus of the character set forth, the combination of two reels for storing an endless strip or film, and means whereby the rotation of the winding reel will be reversed by the tension on one portion of the film and such reversal will actuate means for reversing the movement of the other reel and simultaneously bring the film in winding relation with the other reel.

2. In a device of the character set forth, the combination of a pair of reels adapted to coact with a projecting machine, means for driving said reels alternately, an endless film, means for forming a loop in the film at predetermined times to bring it into winding engagement with the respective reels and means actuated by the tension of the film for reversing the direction of the driven reel to cause the film to be shifted into winding relation with the other reel and simultaneously to cause the second reel to be driven while permitting the first reel to run free.

3. The combination with a projecting machine having an endless film, of a pair of reels, a loop forming means for bringing the film into winding relation at different times with one or the other of said reels, friction drives for said reels, guides for said film arranged so that when the film has been wound on one reel and unwound from the other reel, the tension on the film will cause the filled reel to be rotated in a direction opposite to its driven motion and means actuated by said reverse movement to cause the film to be brought into winding relation with the other reel and at the same time to cause the other reel to be driven while permitting the first reel to run free, the arrangement being such that the film will be wound first on one reel and unwound from the other reel, then wound on the second reel while being unwound from the first reel.

4. A winding device for endless films or bands comprising two winding reels having fixed axes and means for reversing the rotation of said reels when one reel becomes empty.

5. The combination with a motion picture machine having an endless film, of a plurality of winding reels, take up mechanism in driven connection with each reel for taking up and paying out the film, said take-up mechanism being actuated by the tension on the film produced by the machine.

6. An automatic film winding device comprising a plurality of reels for winding up and unwinding the film, means for intermittently driving the respective reels, a train of friction gears for controlling said driving means and means for reversing the rotation of said gears.

7. The combination with a continuous automatic motion picture machine using an endless film, of two reels having fixed axes each of which alternately takes up and passes out the film and means coacting with said reels to pass a loop of the film within the hub of the respective reel when it is about to take up the film.

8. Means for winding up and paying out an endless film, comprising two reels rotating about fixed centers, means for bringing the film alternately into winding relation with the reels and means for actuating the reels to wind up the film on one reel and permitting its being unwound from the other reel and then reversing such action.

9. In a winding device, the combination of a pair of reels having hubs formed of fixed parallel bars and means for forming a loop in a band and bringing it into engagement with the hub of one or the other of said reels.

10. In a winding device, the combination of a pair of reels having hubs adapted to receive loops of a film or the like, an arm pivoted adjacent to said reels and a yielding finger on said arm for bringing the film into winding relation with the respective reels.

11. A loop forming member for a film winder, comprising a resilient finger and means to actuate the finger to bring it into and out of engagement with the film.

12. The combination of a frame, three parallel shafts mounted in said frame, reels secured to two of said shafts, a projecting machine having a continuous film, means mounted on the third shaft for forming loops in the film and bringing the loops into engagement with the hubs of the reels, means for turning said shafts, wheels mounted on the three shafts, the wheels on the shafts bearing the reels being adapted to engage with the wheel on the center shaft, the latter being provided with flat places in the circumference thereof, means for limiting the rotation of the center shaft and means actuated by the center shaft for alternating the driving of the other two shafts.

13. The combination with a projecting machine having a motor for driving the same and having a continuous film, of a pair of reels for winding up and unwinding said film, shafts to carry said reels, wheels on the end of said shafts, an intermediate shaft having a wheel with recesses in the periphery thereof and adapted to engage with the wheels on the reel shafts, an arm on said intermediate shaft having a counterweight at one end and a yielding finger at the opposite end for engagement with the film to bring it into winding relation at times with the respective reels, means for driving the reels from the motor and means actuated by the intermediate shaft for throwing the driving means into and out of operation with the reels.

14. The combination with two winding reels, of a pair of friction wheels operatively connected with the respective reels, a third friction wheel adapted to coact with the first named wheels, said third wheel having flat places in the periphery thereof.

15. In a winding apparatus, the combination of a plurality of wheels rotating on fixed centers, an endless band adapted to engage with said reels, means for actuating the band continuously in one direction and means adapted to cause the band to wind upon one reel while being unwound from the other reel and means for reversing the action whereby the film will be continuously wound and unwound from said reels.

16. In a machine for winding an endless band, two reels rotating about fixed centers and coacting with said band for alternately winding up and unwinding the same and means for reversing the rotation of said reels.

17. In a machine for winding an endless film, two reels for winding up and unwinding the film and frictional means for intermittently reversing the rotation of said reels to cause them to alternately wind up and pay out said film.

18. In a motion picture apparatus using an endless film, a stationary support, a plurality of reels on said support, means for doubling said film and winding said double film on the reel which is in winding condition and means operated by the tension of said film to control the winding and unwinding of said reels.

19. In a device of the character set forth, the combination of a frame, a plurality of reels mounted on said frame and adapted to wind and unwind an endless film or band, means actuated by the tension of the film for reversing the movement of one of said reels and means operated by the reversal of the movement of said reel to engage the film with an empty reel.

20. In a device of the character set forth, the combination of a pair of reels, means for driving said reels and means for shifting the driving apparatus whereby one reel will be driven when the other is not driven, the arrangement being such that the tension produced at a predetermined time on the film will first reverse the reel which is in winding condition, second, will operate the mechanism to cause the film to engage with the empty reel and, third, will control the take-up or driving mechanism for causing the reels to take up and pay out the film.

CHRISTEN J. PETERSON.